United States Patent [19]

Baker

[11] 4,166,396

[45] Sep. 4, 1979

[54] PRESSURE INDICATING DEVICE

[75] Inventor: William E. Baker, Houston, Tex.

[73] Assignee: Gauges International, Inc., Houston, Tex.

[21] Appl. No.: 895,776

[22] Filed: Apr. 12, 1978

[51] Int. Cl.² .............................................. G01L 7/08
[52] U.S. Cl. ..................................... 73/706; 73/707; 73/716
[58] Field of Search ................. 73/715, 706, 729, 716, 73/707, 708, 709, 711, 710, 712, 714, 717, 720, 722, 731

[56] References Cited

U.S. PATENT DOCUMENTS

| 18,526 | 10/1857 | Allen | 73/715 |
| 2,297,679 | 10/1942 | Allen | 73/715 |
| 2,537,729 | 1/1951 | Allen | 73/729 |

Primary Examiner—Donald O. Woodiel
Attorney, Agent, or Firm—James L. Jackson

[57] ABSTRACT

A pressure indicating device according to the present invention includes a diaphragm assembly engaging one extremity of an indicator actuating means whereby flexing of the diaphragm caused by fluid pressure or other force will induce movement of the indicator actuating means. Movement of an indicator in relation to a fixed delineated face caused by movement of the indicator actuating mechanism results in a visual representation of reading bearing some predetermined relationship to the pressure causing the flexing of the diaphragm.

3 Claims, 4 Drawing Figures

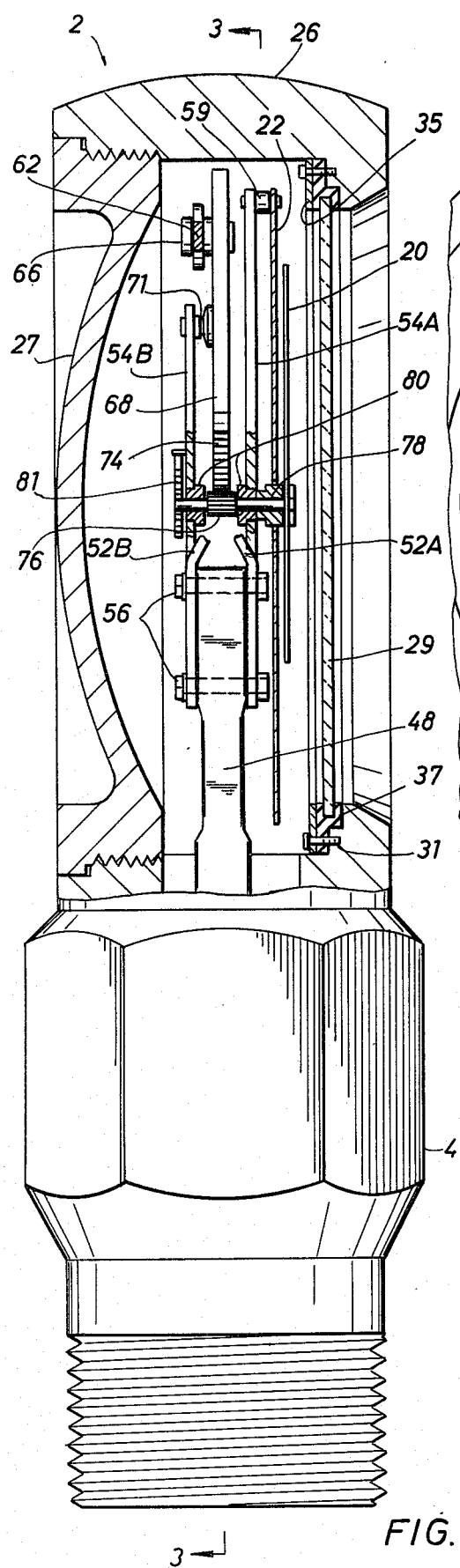
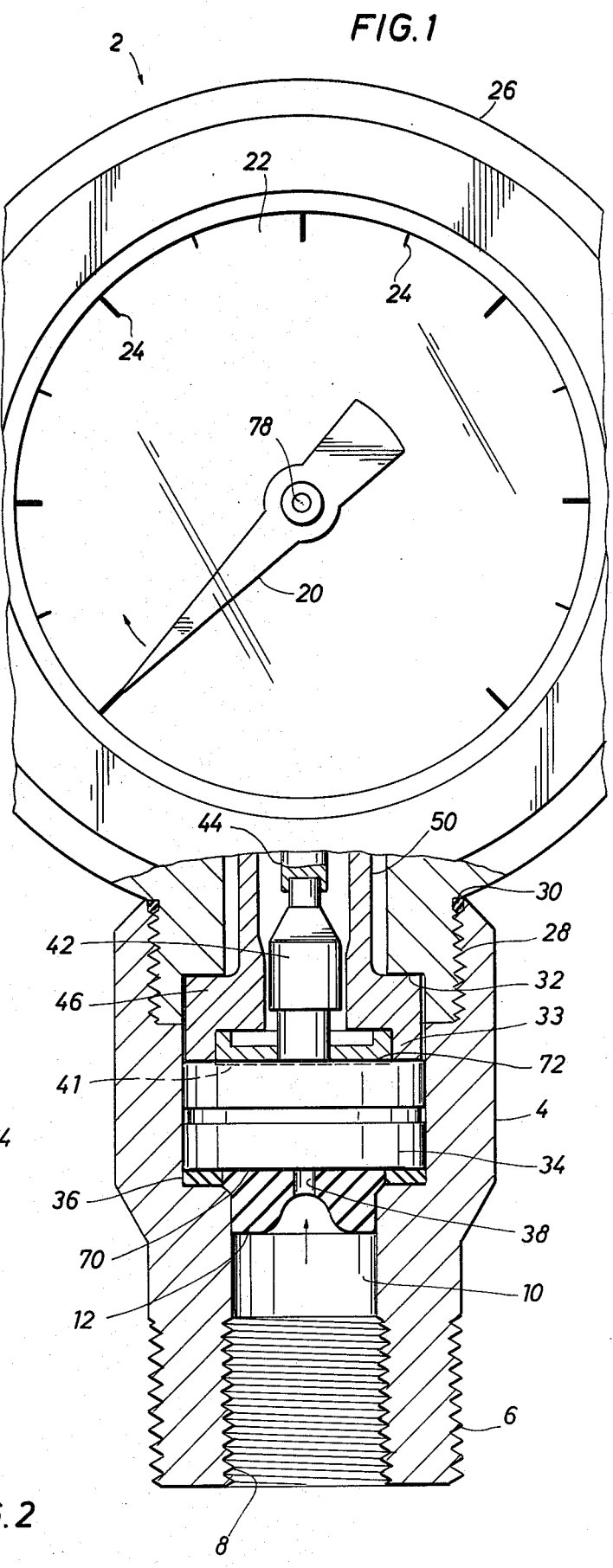
FIG.1
FIG.2

PRESSURE INDICATING DEVICE

FIELD OF THE INVENTION

This invention relates generally to fluid pressure sensing and indicating devices, commonly known as pressure gauges. More particularly, this invention relates to an apparatus that provides in one embodiment an accurate and highly sensitive pressure sensing mechanism, responsive to diaphragm flexing caused by fluid pressure. The invention disclosed herein is applicable to a wide range of pressure levels, fluids, temperatures, and sensing conditions, while at the same time providing an easily and quickly readable visual indication of pressure.

BACKGROUND OF THE INVENTION

Pressure indicating devices for sensing and visually indicating fluid pressures are well known in the mechanical art. Such devices are used in almost every industry, and therefore a wide variety of environs and performance criteria must be evaluated before the proper device is selected for a particular use.

Probably the most frequently used pressure-indicating device is the C-spring bourdon-tube pressure gauge. Gauges of this type consist of a flattened tube of spring bronze or steel bent into a circle. Pressure inside the tube tends to straighten the tube. This motion rotates a pointer through a pinion-and-sector mechanism whereby the pointer indicates the pressure on a dial face. The tube may be bent through several turns to form a spiral or helical element to amplify the motion of the pointer.

The simplicity of the bourdon-tube pressure gauge is of great benefit in keeping manufacturing costs down and providing an adequate gauge sufficient for many applications. The pointer-type indicator promotes easily readable pressure readings and promotes the use of easily readable dual scales on one gauge.

Bourdon-tube gauges, because they use a hollow tube into which the fluid to be measured must enter, can be easily plugged by viscous fluids or fluids containing debris and large particulate matter. Bourdon-tube gauge devices are also disadvantageous because the change in volume of the bourdon-tube due to pressure changes is typically very small and therefore efficient dampening is difficult. Shock and vibration also have a very detrimental effect upon this type of gauge.

For the above reasons, other types or designs of pressure indicating devices have been devised and are widely used in the mechanical art. One such device is the diaphragm guage which may employ a capsule composed of two diaphragms bonded by suitable means to either of the axial ends of a short cylinder. The space between may be filled with some relatively imcompressible fluid or other means such that a pressure causing deflection of one diaphragm will cause a corresponding deflection of the opposite diaphragm.

Pressure gauges using diaphragms typically employ suitable mechanical translating mechanisms to translate the relatively small deflection of the diaphragm into a visually readable form. In the past, this form constituted a movable disc with demarcation and numerals thereon which rotates in response to pressure changes on the diaphragm.

The diaphragm-type gauges overcome many of the disadvantages of the bourdon-tube type gauges, i.e., they can be easily dampened by a restricting screw; they are not easily plugged because the fluid to be measured does not enter the device; they are very resistant to shock and vibration; and they are very accurate.

With the foregoing in mind, it is therefore a primary object of the present invention to provide a novel pressure measuring device that offers the advantages of a diaphragm-type gauge with the easy readability of the bourdon-tube type gauge.

It is also a feature of the present invention to provide a pressure measuring device that is resistant to shock and vibration.

Another feature of the present invention is to provide a mechanism that may easily be dampened without significant loss of accuracy.

Among the several features of the present invention is noted the contemplation of a novel pressure measuring device that is uniquely designed to achieve easily readable, accurate and reliable pressure readings when used in conjunction with a "mud" pump commonly used in oil well operations.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

In accordance with the present invention, a pressure measuring device is provided that may include a diaphragm assembly which receives the exerted pressure of the measured fluid on its face and bends or deflects, thereby transmitting such movement through a thrust means to a translator means. The translator means translates the pressure-induced deflection of the diaphragm into movement of an indicator actuating means to rotate an indicator which provides a visible readout, in appropriate numbers or scale, of the pressure being exerted upon the diaphragm assembly by the fluid.

The use of a diaphragm assembly is of particular advantage because it separates most of the pressure measuring mechanism from the fluid being measured, thereby preventing clogging and/or corrosion of the device by the fluid. The diaphragm assembly therefore "insulates" the delicate and sensitive mechanism of the gauge from many sources of harm and innaccuracy. In a preferred embodiment of the present invention, the diaphragm assembly is comprised of two spaced and generally parallel related diaphragms containing a substantially incompressible fluid therebetween, or other suitable mechanism, so that a pressure causing deflection of one diaphragm will cause a corresponding deflection of the opposite diaphragm. Other types of diaphragm assemblies, including one comprised of only one diaphragm, may be use in the proper circumstances. The diaphragm assembly may also have means for dampening the reaction of the diaphragm element to fluid pressure.

The indicator actuating means may include a thrust means in the form of an elongated member releasably and movably connected to the diaphragm assembly. In addition, the indicator actuating means may utilize a translator means comprising an "M" -shaped device wherein the two upper portions or "forks" are caused to spread apart in relation to each other by the force of the thrust means at the center inverted apex. The translator means therefore translates the upward motion of the thrust means into a preselected diverging movement of the forks. The balance of the indicator actuating means amplifies this motion of the diverging forks, and may cause an indicator to rotate in relation to a dial face plate. Movement of the indicating actuating means may also be dampened by a viscous fluid encompassing the indicator actuating means.

It is to be understood that all of the movements herein described are precise, preselected movements that interrelate one with the other to provide an accurate, visible readout of the fluid pressure. Although movement of the diaphragm, thrust means and translator means may be relatively small and/or undetectable to the naked eye, their movement is nevertheless precise and amplification by the indicator actuation mechanism results in an accurate pressure reading.

IN THE DRAWINGS

FIG. 1 is a front elevation, partially in section, of one embodiment of the present invention depicting the movable indicator in relation to the dial face plate and showing the diaphragm assembly and thrust means of the device.

FIG. 2 is a side view, partially in section, of the embodiment depicted in FIG. 1.

DETAILED DESCRIPTION OF THE PREFERRED EMBODIMENT

Figure 3:
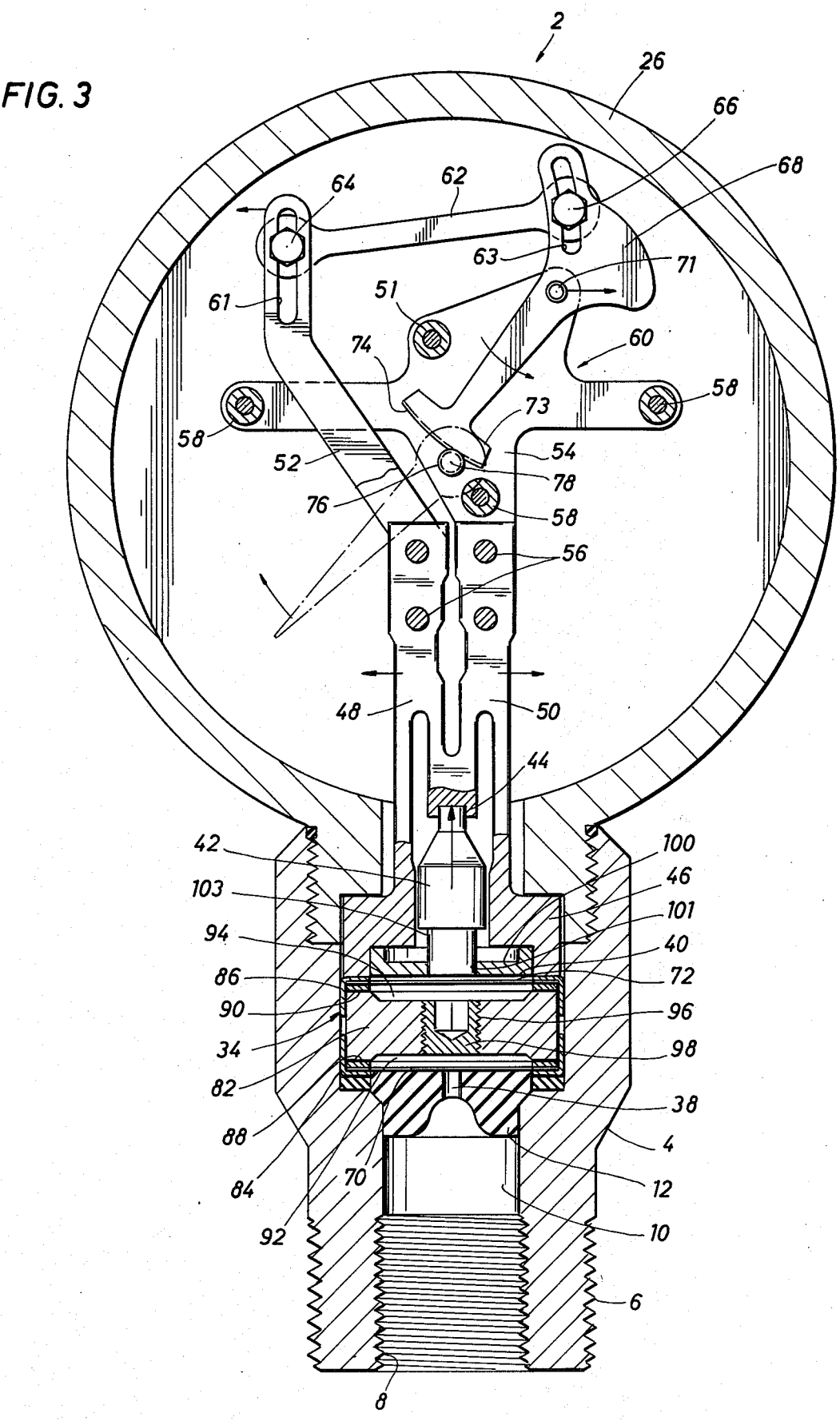
FIG. 3 is a full section of one embodiment of the present invention, taken along lines 3—3 of FIG. 2, showing the diaphragm assembly, indicator actuating means, and the internal structure of the diaphragm assembly.

Referring now to the drawings and particularly to FIG. 1, there is shown a pressure gauge generally at 2. Threaded housing 4, when secured to a tank or pipe or other object (not shown) by external threads 6 or internal threads 8, will allow a fluid to enter chamber 10. Through appropriate mechanisms hereinafter described in detail, the pressure exerted by the fluid upon protector 12 and lower diaphragm 70, is translated into movement of pointer or indicator 20 in the direction shown in relation to face plate 22. Demarcations 24 are located on face plate 22 in such a manner that pressure readings in appropriate or even multiple scales result when indicator 20 moves in response to pressure exerted by the fluid upon protector 12 and lower diaphragm 70. The entire face plate 22 may be encapsulated and protected by the upper body 26.

As shown in FIG. 1, upper body 26 is threaded into housing 4 by means of threads 28. A seal or gasket 30 is provided at the outer extremity of the thread joint to prevent leakage at the thread. Tightening of upper body 26 into housing 4 causes shoulder surface 32 of upper body 26 to force the lower portions 33 of translator means 46 into retaining relationship with the diaphragm assembly 34. A gasket o seal 36 is provided to maintain a substantially impenetrable seal between the inner workings of the gauge and the fluid contained in chamber 10. Upper body 26 has a threaded back portion 27 (see FIG. 2) and a front glass portion 29 fastened to upper body 26 by suitable attachment means 31 in cooperation with seal or gasket 35 and mounting ring 37.

When gauge 2 is in place on a pressurized tank or on a mud pump, for instance, the pressurized fluid to be measured enters chamber 10 and exerts a pressure of flexible protector 12, which may be manufactured of rubber or neoprene. The fluid will also exert pressure directly on lower diaphragm 70 of diaphragm assembly 34 through passage 38 in protector 12.

As pressure is exerted on lower diaphragm 70, the diaphragm will flex and be forced upward a certain predetermined amount, depending on the pressure. This movement of the lower diaphragm 70 will create an internal pressure within diaphragm assembly 34, as hereinafter explained in detail. This will result in an upward predetermined movement of upper diaphragm 72 of diaphragm assembly 34, which may also be protected by a suitably flexible flat protector 41 located thereon. Upward movement of the upper diaphragm 72 will force thrust means 42 likewise upward against thrust seat 44 of translator means 46.

Referring now to FIGS. 2 and 3, it can be seen with the aid of the arrows that upward movement of thrust means 42 against seat 44 causes the prongs 48 and 50 of translator means 46 to move outwardly or apart from each other. This spreading movement causes extension arms 52 and 54 of indicator actuator mechanism 60, which are securely fastened to forks 48 and 50, respectively, by securing means 56, to also spread apart. Arms 52 and 54 are comprised of two sides 52A and 52B and 54A and 54B, respectively, which attach to each side of respective prongs 48 and 50. Sides 54A and 54B of arm 54 remain in substantial parallel relationship by spacers 58, while sides 52A and 52B of arm 52 merge forming a substantially single arm 52 that moves between spaced-apart arms 54A and 54B. The spreading apart of arms 52 and 54 causes arm 52 to pull mechanism link 62 in the direction shown. Mechanism link 62 is secured by pin connetions 64 and 66 to arm 52 and sector gear 68, which is rotatable about pin 71. The end of the sector gear 68 opposite pin connection 66 has head 73 with teeth 74 that engage pinion gear 76. Rotation of gear 68 causes rotation of pinion gear 76, which is affixed to pin 78 extending through face plate 22, and moves indicator 20 affixed thereto (See also FIG. 1). Bushings 80 may be provided to promote low friction rotation of the linkage and to insure accurate rotation of the sector gear. Spring 81 helps maintain sector gear 68 in cooperative smooth contact with gear 76, and, in addition, helps keep all the linkage in that vicinity of the mechanism in smooth cooperative contact and helps prevent blacklash.

Adjustment slots 61 and 63 may be provided to allow the relation between readout and pressure upon the lower diaphragm 70 to be varied while the device is in place. In this regard, the location of pin connections 64 and 66 in relation to slots 61 and 63, respectively, may be varied, thereby varying the "null" or zero point of the indicator 20 of the gauge and the movement of the indicator 20 in response to a given pressure in chamber 10. It is apparent that the indicator actuating mechanism 60 may encompass diverse methods of actuating the movement of upper diaphragm 72 and translating such movement to corresponding movement of indicator 20, only one such method being described herein.

It can thus be seen that intricate, preselected movements of the various parts and mechanisms of this invention, caused by a pressure or force on the lower diaphragm 70, result in accurate movement of indicator 20. This movement, when correlated with the location of properly scaled demarcations 24, makes it possible for an operator to easily and quickly read the pressure. Pressure readings may be taken in metric or English units of measurement, depending on the scale used, or both scales may be used, if desired.

As stated hereinabove, this particular invention has the feature of being dampened. In applications involving mud pumps where there is a pounding, rapid change of pressure, this dampening is of particular importance because it reduces damage to the gauge and substantially lessens wildly erratic pressure readings.

In this regard, and referring to the portion of FIG. 3 wherein the diaphragm assembly 34 is shown in section, it can be seen that diaphragm assembly 34 is composed of two cylindrical clamp rings 84 and 86 on either end, respectively, of dampener support 82. These clamp rings retain diaphragms 70 and 72 securely to the diaphragm assembly 34. Seal rings 88 and 90 provide a tight seal and retain fluid contained in spaces 92 and 94 within diaphragm assembly 34. The dampener support 82 is formed to define a threaded cylindrical passage 96 between receptacles 92 and 94 located substantially in its center, and a threaded chokescrew 98 is threaded therein.

As pressure is exerted on lower diaphragm 70, it deflects inwardly in relation to the diaphragm assembly 34, or upwardly, with the greatest deflection at the center of the diaphragm, thereby pressurizing the fluid within lower receptacle 92. This pressure is transmitted through the fluid in the interstices of the threaded connection between dampener support 82 and chokescrew 98 to the fluid within upper receptacle 94, which in turn puts pressure on upper diaphragm 72, causing it to deflect upwardly. As with diaphragm 70, the greatest deflection of diaphragm 72 is at its center. Range plate 100, located on top of protector 40 on top of diaphragm 72, and secured thereon by translating means 46, guides thrust means 42. The physical size of the aperture 101 in the range plate and the cross sectional dimension of the lower portion 103 of the thrust means, together with the spring rate of translator means 46, determines the pressure range within which the gauge is operative.

It can thus be seen that the various components of the diaphragm assembly 34 cooperate to dampen the reaction of the upper diaphragm caused by pressure on the lower diaphragm. Therefore, the dampening feature of diaphragm assembly 34, in cooperation with the rest of the mechanism comprising the gauge disclosed herein, causes the movement of the indicator 20 to be dampened so as not to move erratically with the rapid changes in pressure.

Figure 4:
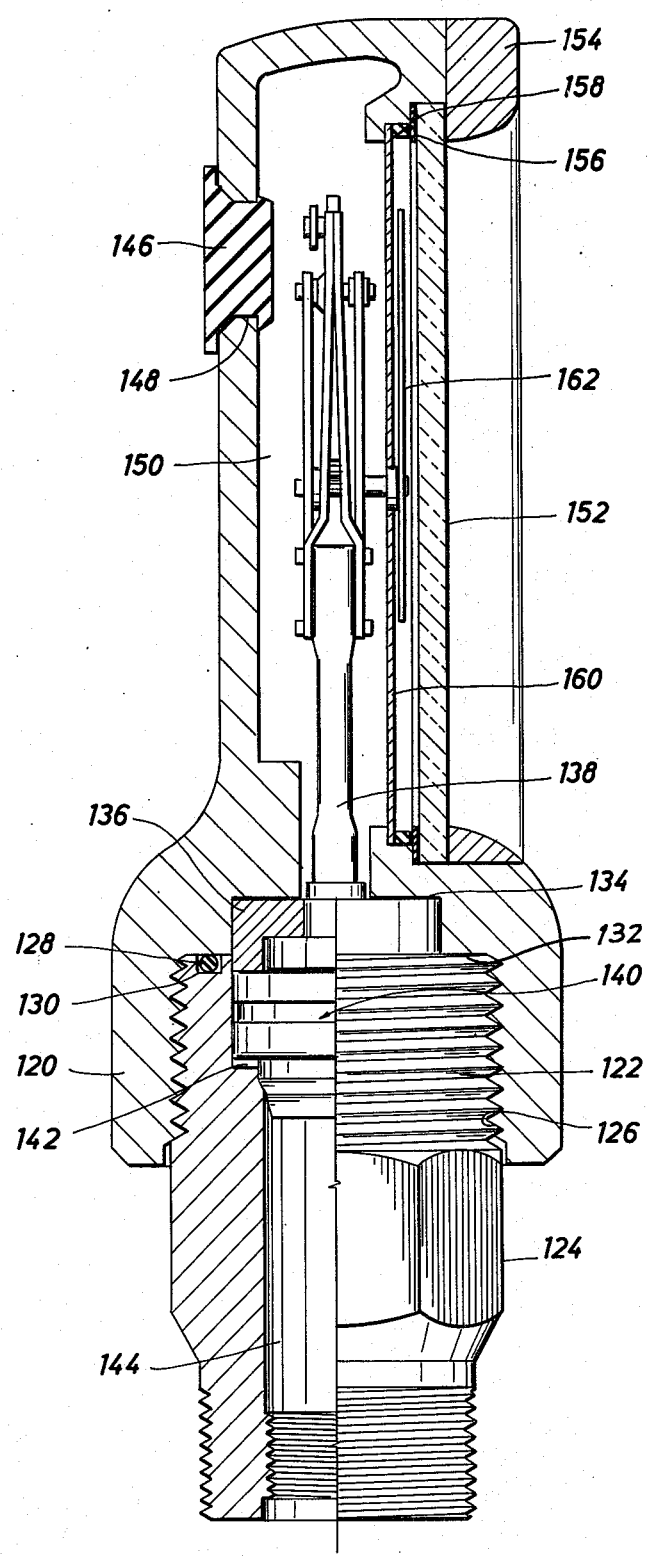
FIG. 4 is a side view, partially in section, of an alternate embodiment of the gauge housing and upper body similar to that depicted in FIG. 2.

Referring now to FIG. 4, an alternate embodiment of the present invention is shown. Specifically, FIG. 4 shows an alternate embodiment of the housing and upper body of the present invention.

Upper body 120 is threaded onto the threads 122 of housing 124 by means of threads 126. Seal ring or gasket 128 is provided in groove 130 to prevent leakage and provide a tight seal against shoulder surface 132 of body 120. Tightening of upper body 120 onto housing 124 causes shoulder surfac 134 of upper body 120 to force the lower portions 136 of translator means 138 into retaining relationship with the diaphragm assembly 140. A gasket or seal 142 is provided to maintain a substantially impenetrable seal between the inner workings of the gauge and the fluid contained in chamber 144.

Upper body 120 has a plug 146 inserted tightly into aperture 148. This plug device enables a suitable fluid (not shown) to be inserted into chamber 150 to fill said chamber and aid in dampening and protecting the indicator actuating means from being damaged or harmed by shock and vibration.

Front glass or otherwise clear viewing plate 152 is held in retained position against gasket 156 by bezel 154. Spacer ring 158 is provided to maintain a minimum predetermined distance between glass 152 and face plate 160 to allow unhindered movement of indicator 162.

Although the pressure gauge disclosed and taught herein is particularly suited to measuring rapidly changing or pulsating pressures, the gauge may also be used to measure relatively static pressures.

Having thus fully described my invention,

I Claim:

1. An apparatus for measuring fluid pressure, comprising:

a housing formed to define a receptacle;

a diaphragm assembly consisting of a pair of diaphragms maintained in spaced relationship by a diaphragm support, and cooperating with said diaphragm support to define a pair of fluid chambers separated by said diaphragm support, said diaphragm support being formed to define a central threaded opening, a threaded plug being received within said threaded opening and defining an interstitial interconnection between said fluid chambers, a substantially incompressible fluid bing contained within said fluid chambers, said diaphragm assembly defining partition means separating said receptacle into a pressure chamber and an ambient chamber, said diaphragm assembly being at least a portion of the partition means between said pressure chamber and ambient chamber and flexible in relation to said diaphragm support by pressure in said pressure chamber transmitted through said fluid within said pair of fluid chambers of said diaphragm assembly;

a face plate in fixed relation to said housing with spaced demarcations on at least one side of said face plate;

an indicator pointer being supported by a rotatable shaft that is movably positionable in relation to said face plate, the position of said indicator in relation to said demarcations on said face plate providing a visual indication of the pressure within said pressure chamber;

a generally M-shaped spring member being supported within said ambient chamber, the side portions of said spring defining spaced generally parallel prongs and the central portion of said spring being interconnected with each of said side portions and being positioned substantially centrally thereof;

a thrust element being movably positioned intermediate said side portions of said spring and engaging both said diaphragm assembly and said central portion of said spring, said thrust element being movable linearly by pressure induced flexing of said diaphragm assembly and inducing linear movement of said central portion of said spring, said linear movement of said central portion of said spring inducing opposing movement of said prongs;

a pair of extension arms being connected to respective ones of said prongs, said extension arms being relatively movable on opposing movement of said prongs;

a sector gear being pivotally supported by one of said extension arms;

a link element interconnecting the other one of said extension arms and said sector gear and causing pivotal movement of said sector gear upon relative movement of said extension arms; and a pinion gear being nonrotatably connected to said rotatable shaft and being rotatably driven by said sector gear, thus rotating said shaft and pointer responsive to opposing movement of said extension arms.

2. An apparatus for measuring fluid pressure as recited in claim 1, wherein:

said demarcations represent a scale in at least one system of measurement.

3. An apparatus for measuring fluid pressure as recited in claim 1, further comprising:

an upper body encompassing said indicator actuating means; and second dampening means contained within said upper body retricting free movement of said indicator actuating means and thus further dampening movement of said indicator.

* * * * *